United States Patent
Enke et al.

(10) Patent No.: US 10,288,167 B2
(45) Date of Patent: May 14, 2019

(54) METHOD FOR OPERATING A TRANSMISSION DEVICE FOR A MOTOR VEHICLE, AND CORRESPONDING TRANSMISSION DEVICE

(71) Applicant: AUDI AG, Ingolstadt (DE)

(72) Inventors: Martin Enke, Ingolstadt (DE); Arne Herrmann, München (DE); Paul Weißbach, Dresden (DE)

(73) Assignee: AUDI AG, Ingolstadt (DE)

( * ) Notice: Subject to any disclaimer, the term of this patent is extended or adjusted under 35 U.S.C. 154(b) by 100 days.

(21) Appl. No.: 15/528,115

(22) PCT Filed: Nov. 20, 2015

(86) PCT No.: PCT/EP2015/077197
§ 371 (c)(1),
(2) Date: May 19, 2017

(87) PCT Pub. No.: WO2016/079287
PCT Pub. Date: May 26, 2016

(65) Prior Publication Data
US 2017/0350501 A1    Dec. 7, 2017

(30) Foreign Application Priority Data

Nov. 20, 2014  (DE) .................... 10 2014 017 174

(51) Int. Cl.
*F16H 59/52* (2006.01)
*F16H 61/02* (2006.01)
(Continued)

(52) U.S. Cl.
CPC ......... *F16H 61/0213* (2013.01); *F16H 59/52* (2013.01); *F16H 59/60* (2013.01);
(Continued)

(58) Field of Classification Search
CPC ...... F16H 61/10; F16H 61/0213; F16H 59/52; F16H 59/60; F16H 2059/082; F16H 2059/0221; F16H 2302/04
See application file for complete search history.

(56) References Cited

U.S. PATENT DOCUMENTS

| 5,612,874 A * | 3/1997 | Schulz ................ F16H 61/0021 477/163 |
| 2005/0090962 A1 * | 4/2005 | Ota ........................ F16H 3/663 701/51 |

(Continued)

FOREIGN PATENT DOCUMENTS

| CN | 1603667 A | 4/2005 |
| CN | 101151479 A | 3/2008 |

(Continued)

OTHER PUBLICATIONS

International Preliminary Report on Patentability dated Jun. 1, 2017 of corresponding application No. PCT/EP2015/077197; 12 pgs.

(Continued)

*Primary Examiner* — Mark J Beauchaine
(74) *Attorney, Agent, or Firm* — Maier & Maier, PLLC (57) ABSTRACT

A method for operating a transmission device for a motor vehicle. A drive gear is selected from a drive gear set and set on a transmission and upon going above a rotational speed upper limit a drive gear with a larger gearing ratio and upon going below a rotational speed lower limit a drive gear with a smaller gearing ratio is selected from the drive gear set and set on the transmission. In a normal operating mode, the drive gear set corresponds to a normal operation drive gear set having a plurality of different drive gears, and the rotational speed upper limit corresponds to a normal operation rotational speed upper limit and the rotational speed lower limit corresponds to a normal operation rotational speed lower limit. In an alternative operating mode the drive (Continued)

gear set corresponds to an alternative operation drive gear set, having a smaller number of different drive gears than the normal operation drive gear set.

9 Claims, 1 Drawing Sheet

(51) Int. Cl.
*F16H 59/60* (2006.01)
*F16H 61/10* (2006.01)
*F16H 59/02* (2006.01)
*F16H 59/08* (2006.01)

(52) U.S. Cl.
CPC ..... *F16H 61/10* (2013.01); *F16H 2059/0221* (2013.01); *F16H 2059/082* (2013.01); *F16H 2302/04* (2013.01)

(56) References Cited

U.S. PATENT DOCUMENTS

2008/0146407 A1 6/2008 Tuckfield
2009/0055062 A1 2/2009 Tsukada et al.

FOREIGN PATENT DOCUMENTS

| CN | 101674950 A | 3/2010 |
| DE | 3534971 A1 | 4/1986 |
| DE | 3922051 C2 | 7/1993 |
| DE | 4219382 A1 | 12/1993 |
| DE | 60008974 T2 | 2/2005 |
| DE | 102004047967 A1 | 5/2005 |
| DE | 102004015966 A1 | 10/2005 |
| DE | 102005049710 A1 | 4/2007 |

OTHER PUBLICATIONS

International Search Report and Written Opinion dated Feb. 12, 2016 of corresponding application No. PCT/EP2015/077197; 11 pgs.
Office Action dated Oct. 9, 2015 of corresponding application No. DE10 2014 017 174.4; 5 pgs.
Office Action dated Nov. 11, 2016 of corresponding application No. DE10 2014 017 174.4; 2 pgs.
Chinese Office Action dated Jul. 31, 2018, in connection with corresponding CN Application No. 201580073616.4 (18 pgs., including English translation).

* cited by examiner

METHOD FOR OPERATING A TRANSMISSION DEVICE FOR A MOTOR VEHICLE, AND CORRESPONDING TRANSMISSION DEVICE

FIELD

The invention relates to a method for operating a transmission device for a motor vehicle, wherein a drive gear is selected from a drive gear set and set on a transmission and/or upon going above a rotational speed upper limit a drive gear with a larger gearing ratio and/or upon going below a rotational speed lower limit a drive gear with a smaller gearing ratio is selected from the drive gear set and set on the transmission. The invention furthermore relates to a transmission device for a motor vehicle.

BACKGROUND

The transmission device is associated with the motor vehicle and accordingly forms, for example, a component of the motor vehicle. In particular, the transmission device lies in an operative connection between a drive mechanism of the motor vehicle and at least one driven axle of the motor vehicle. Of course, several driven axles may also be provided. In this case, the transmission device lies in the operative connection between the drive mechanism and at least some of the driven axles, in particular all of the driven axles.

The drive mechanism serves to provide a torque meant to drive the motor vehicle. This torque is transmitted across the transmission device or across the transmission associated with the transmission device. The transmission device serves to adjust different gearing ratios between the drive mechanism and the at least one driven axle. Each of these gearing ratios is associated with a drive gear. Usually there is a plurality of drive gears, each drive gear being associated with a gearing ratio, which is different from the gearing ratios of the other drive gears. The drive gears preferably include several forward drive gears. In addition, at least one reverse gear may be associated with the drive gears.

Thus, with the aid of the transmission, different drive gears or gearing ratios can be adjusted. Accordingly, the transmission is a shifting transmission. In order to set a particular drive gear on the transmission, for example when starting to drive the motor vehicle, the drive gear is selected from a drive gear set, which preferably comprises a plurality of drive gears, in particular all drive gears provided by the transmission. The selected drive gear is then set on the transmission, so that the gearing ratio associated with the drive gear is subsequently present between the drive mechanism and the at least one driven axle. For example, the starting operation occurs when the motor vehicle is supposed to be placed in motion from a standstill.

In addition or alternatively it may be provided that, upon going above a rotational speed upper limit, especially by a rotational speed of an input shaft of the transmission in operative connection with the drive mechanism, or able to be placed in such a connection, and/or a rotational speed of the drive mechanism, a drive gear is selected from the drive gear set which has a larger gearing ratio than the drive gear currently set on the transmission. On the other hand, in addition or alternatively, it may be provided that, upon going below a rotational speed lower limit, especially by the rotational speed of the input shaft and/or the rotational speed of the drive mechanism, a drive gear is selected from the drive gear set which has a smaller gearing ratio than the drive gear currently set on the transmission. The drive gear selected in this way is then set on the transmission so that the gearing ratio associated with it is present between the drive mechanism and the at least one driven axle.

Now, the problem which the invention proposes to solve is to propose a method for operating a transmission device which has benefits over other methods, in particular, one which enables a greater driving comfort of the motor vehicle.

SUMMARY OF THE DISCLOSURE

It is provided that, in a normal operating mode, the drive gear set corresponds to a normal operation drive gear set having a plurality of different drive gears, and/or the rotational speed upper limit corresponds to a normal operation rotational speed upper limit and/or the rotational speed lower limit corresponds to a normal operation rotational speed lower limit, and in an alternative operating mode the drive gear set corresponds to an alternative operation drive gear set, having a smaller number of different drive gears than the normal operation drive gear set, and/or the rotational speed upper limit corresponds to an alternative operation rotational speed upper limit which is different from the normal operation rotational speed upper limit and/or the rotational speed lower limit corresponds to an alternative operation rotational speed lower limit which is different from the normal operation rotational speed lower limit.

Thus, the method for operating a transmission device comprises two different operating modes, namely, the normal operating mode and the alternative operating mode. Preferably, the operating of the transmission device occurs either in the normal operating mode or in the alternative operating mode. In the alternative operating mode, at least one quantity is selected to be different than in the normal operating mode, this quantity being the drive gear set, the rotational speed upper limit or the rotational speed lower limit. Of course, in the alternative operating mode also several or all of the mentioned quantities may be selected different than in the normal operating mode. A shifting between the normal operating mode and the alternative operating mode and/or vice versa is undertaken for example as a function of at least one operational quantity and/or state quantity.

For example, it is provided that the drive gear set in the normal operating mode corresponds to the normal operation drive gear set and in the alternative operating mode it corresponds to the alternative operation drive gear set. In addition or alternatively it may be provided that the rotational speed upper limit in the normal operating mode corresponds to the normal operation rotational speed upper limit and in the alternative operating mode it corresponds to the alternative operation rotational speed upper limit. Furthermore, in addition or alternatively it may be provided that the rotational speed lower limit in the normal operating mode corresponds to the normal operation rotational speed lower limit and in the alternative operating mode it corresponds to the alternative operation rotational speed lower limit. The normal operation drive gear set is different from the alternative operation drive gear set and/or the normal operation rotational speed upper limit is different from the alternative operation rotational speed upper limit and/or the normal operation rotational speed lower limit is different from the alternative operation rotational speed lower limit.

For example, the normal operation drive gear set includes all drive gears or at least all forward drive gears of the transmission. Accordingly, the drive gear adjusted or being adjusted on the transmission in the normal operating mode is selected from all drive gears or at least all forward drive gears of the transmission. In the alternative operating mode, on the other hand, the drive gear set corresponds to the alternative operation drive gear set, which merely has a smaller number of different drive gears than the normal operation drive gear set. For example, the alternative operation drive gear set only has a few, but not all drive gears, especially forward drive gears, that are contained in the normal operation drive gear set.

On the whole, therefore, a smaller number of different drive gears are available in the alternative operating mode than in the normal operating mode. Furthermore, it may be provided that the shifting points in the alternative operating mode are selected differently than in the normal operating mode, i.e., either the rotational speed upper limit, the rotational speed lower limit, or both rotational speed limits in the alternative operating mode are selected differently than in the normal operating mode. With such a procedure, the number of shifting events during a drive with the motor vehicle may be reduced, especially in near-standstill driving states, such as may occur for example in stop and go traffic or in a traffic jam. Frequent shifting events have a hectic effect and disturb the motor vehicle. Furthermore, they are perceived as unpleasant by the passengers of the motor vehicle. This may be counteracted with the procedure described here.

In addition or alternatively it may be provided to close a starter element and/or a bridging clutch of the starter element in the normal operating mode upon going above a first rotational speed threshold and in the alternative operating mode upon going above a second rotational speed threshold or a third rotational speed threshold, wherein the second rotational speed threshold is larger than the first rotational speed threshold and the third rotational speed threshold is larger than the second rotational speed threshold. The bridging clutch in particular serves to bridge the starter element. For example, the bridging clutch is closed when the starter element is likewise closed. With the help of the bridging clutch, the starter element may be bridged; when the bridging clutch is closed, its input side is thus rigidly connected to its output side.

The rotational speed thresholds are indicated for example in the form of absolute values or relative values, especially in terms of an idling speed of the drive mechanism or the input shaft. As soon as the rotational speed of the drive mechanism or the input shaft goes above the corresponding rotational speed threshold, the starter element or the bridging clutch is closed, especially closed entirely. For example, it is provided to close the starter element at least partly when the rotational speed is less than the rotational speed threshold, and to close it entirely when the rotational speed reaches or goes beyond the rotational speed threshold. It may be provided to close the starter element all the more as the rotational speed is greater, especially as the rotational speed goes further beyond the idling speed.

In addition, it may be provided, upon reaching or going beyond the rotational speed threshold, i.e., with the starter element closed entirely, to likewise close the bridging clutch in order to bridge the starter element. The closing of the bridging clutch may also be provided only upon going above a third rotational speed threshold, which at least in the alternative operating mode is greater than the second rotational speed threshold.

In the normal operating mode, on the other hand, the third rotational speed threshold may correspond to the first rotational speed threshold. Accordingly, it is provided in the normal operating mode to close the starter element more and more until reaching the first rotational speed threshold, so that it is entirely closed upon reaching the first rotational speed threshold. At the same time, the bridging clutch is closed upon reaching the first rotational speed threshold.

In the alternative operating mode, similarly, the starter element should be closed more and more until reaching the second rotational speed threshold, so that it is entirely closed upon reaching the second rotational speed threshold, which is greater than the first rotational speed threshold. Now the bridging clutch may likewise be closed with the reaching of the second rotational speed threshold. Alternatively, this can be done with the reaching or going beyond the third rotational speed threshold, which in turn is greater than the second rotational speed threshold.

For example, the second rotational speed threshold is at least 10%, at least 20%, at least 30%, at least 40% or at least 50% greater than the first rotational speed threshold. The third rotational speed threshold may in turn be at least 10%, at least 20%, at least 30%, at least 40% or at least 50% greater than the second rotational speed threshold. With the described procedure, an unpleasant jerking of the motor vehicle during a slow driving of the motor vehicle with frequent stops or a traffic jam may be avoided.

In one preferred embodiment of the invention it is provided that a smallest drive gear of the alternative operation drive gear set is larger than a smallest drive gear of the normal operation drive gear set. By this is meant in particular that the gearing ratio of the smallest drive gear of the alternative operation drive gear set is larger than the gearing ratio of the smallest drive gear of the normal operation drive gear set. In this way, for example, the starting of the motor vehicle in the alternative operation drive gear set can be done with a larger drive gear than in the normal operation drive gear set, while the starting or the starting process is carried out with the smallest available drive gear of the respective drive gear set.

In another preferred embodiment of the invention it is provided that the smallest drive gear of the alternative operation drive gear set corresponds to a drive gear following the smallest drive gear of the normal operation drive gear set. Such a procedure has already been discussed. In other words, it is provided that the alternative operation drive gear set has all drive gears of the normal operation drive gear set with the exception of the smallest drive gear or the smallest drive gears. For example, the smallest drive gear of the alternative operation drive gear set thus corresponds to the drive gear of the normal operation drive gear set immediately following the smallest drive gear. Of course, several of the smallest drive gears may also be absent from the alternative operating mode drive gear set, so that the alternative operating mode drive gear set has all the drive gears of the normal operating mode drive gear set with the exception of a plurality of the smallest drive gears, thus for example at least two of the smallest drive gears.

Accordingly, it is provided for example that the normal operation drive gear set has at least the drive gears "1", "2" and "3" (which may be expanded, at will, to four drive gears, five drive gears, six drive gears, seven drive gears, eight drive gears or nine drive gears), while the alternative operation drive gear set has the drive gear "2" or "3" as the smallest drive gear (and in addition the other drive gears of the normal operation drive gear set), thus on the whole at least the drive gears "2" and "3" in the former case. Therefore, in the alternative operating mode the starting of the motor vehicle during which the smallest available drive gear is engaged is done with a larger drive gear and accordingly a larger gearing ratio than in the normal operating mode.

Of course, it may be provided that the smallest drive gear of the alternative operation drive gear set is selected in dependence on at least one operational state and/or one operational parameter. For example, the smallest drive gear of the alternative operation drive gear set is selected to be larger as the maximum driving speed attained after the starting is higher on average.

One modification of the invention calls for the smallest drive gear of the alternative operation drive gear set to be designed as a starting gear. This means that the smallest drive gear of the alternative operation drive gear set is selected in such a way that the starting of the motor vehicle is possible in reliable manner when this drive gear is adjusted on the transmission. Accordingly, for example, the smallest drive gear of the alternative operation drive gear set may also be selected in dependence on the road surface gradient, the smallest drive gear of the alternative operation drive gear set being preferably selected to be larger as the starting of the motor vehicle is more assisted by the force of gravity, for example, because the motor vehicle is parked on a steep slope. On the other hand, if the road surface gradient indicates a gradient which needs to be overcome by the motor vehicle during the starting, the smallest drive gear of the alternative operation drive gear set will be selected to be smaller as the road surface gradient is larger.

In another especially preferred embodiment of the invention it is provided that the alternative operation rotational speed upper limit is high than the normal operation rotational speed upper limit and/or that the alternative operation rotational speed lower limit is lower than the normal operation rotational speed lower limit. This means that a changing of the drive gear in the alternative operating mode will occur later than in the normal operating mode. In particular, it is provided that during an accelerating of the motor vehicle, i.e., under increasing rotational speed of the input shaft of the transmission and/or the drive mechanism, the presently engaged drive gear or the one set on the transmission will be held longer, and accordingly only shifted at higher rotational speed to a larger drive gear or a drive gear with larger gearing ratio.

In addition or alternatively it may also be provided that, during a decelerating of the motor vehicle, i.e., under decreasing rotational speed, the presently engaged drive gear or the one set on the transmission will be held longer. Accordingly in the alternative operating mode, a smaller drive gear or a drive gear with a smaller gearing ratio will only be set on the transmission at a lower rotational speed than in the normal operating mode.

One modification of the invention calls for shifting to the alternative operating mode if one or more of the following conditions applies: a particular driving program is set on the transmission device, especially one from a reliable driving program set, or a particular driving mode; and/or a driving speed is less than or equal to a driving speed threshold; and/or a road surface gradient is less than or equal to a road surface gradient threshold; and/or an absolute acceleration is less than or equal to an acceleration threshold; and/or a steering angle is less than or equal to a steering angle threshold; and/or a drive gear shift frequency within the drive gear set and/or a subset of the drive gear set surpasses a drive gear shift frequency threshold; and/or a temperature lies within a temperature range; and/or an integrated value of the driving speed lies within a driving speed range; and/or an accelerator pedal position is less than or equal to an accelerator pedal position threshold; and/or a temporal gradient of the accelerator pedal position is less than or equal to an accelerator pedal position gradient threshold; and/or a trailer operation is not present; and/or a vehicle's weight lies within a particular vehicle's weight range.

If one or more of the mentioned conditions applies, especially if all of the mentioned conditions apply, a shift to the alternative operating mode may occur, for example from the normal operating mode. The transmission device for example may be addressed via a so-called "shift by wire" actuation. This means that an exclusively electronic and/or optical communication is present between a selector lever and the transmission device, especially no mechanical and/or hydraulic communication. However, the shift lever is also present preferably in other actuation configurations, for example, in a mechanical and/or manual actuation.

The driver of the motor vehicle can set the desired driving program on the selector lever, in particular my moving the selector lever to a particular position. The position of the selector lever is now relayed, preferably electronically and/or optically, especially exclusively in this manner, to the transmission device. For example, the selector lever may be disposed in a parking position "P", a reverse driving position "R", a neutral position "N" as well as a forward driving position "D". Corresponding to these positions, a parking program, a reverse driving program, a neutral program and a forward driving program may be present. Of course, the program executed may also be selected in a different way.

Thus, the aforementioned driving program is present, for example, if the selector lever is placed in the forward driving position, i.e., the transmission device is adjusted for a forward driving of the motor vehicle. Now, there may only be a shift to the alternative operating mode if the particular driving program, especially the forward driving program, is set on the transmission device. Upon selecting the reverse driving program, the alternative operating mode preferably need not be performed or there should be a shift back to the normal operating mode.

Preferably, in addition or alternatively a driving mode may be selected. This describes, for example, the desired driving style, i.e., sporty, efficient, or automatic, in particular. In the latter case, the driving style automatically switches between sporty and efficient, for example, especially in continuous fashion. The shifting to the alternative operating mode is now only allowed or carried out if the selected driving mode corresponds to the particular driving mode. For example, the particular driving mode corresponds to the efficient or automatic driving mode. The mentioned condition is then fulfilled only if the efficient or the automatic driving mode is selected. In the sporty driving mode the alternative operating mode should no longer be carried out. Naturally, many other driving modes may be realized in which the alternative operating mode can either be carried out or not carried out. Quite generally, the driving modes may be called first driving mode, second driving mode and so on.

In addition or alternatively, the driving speed must be less than or equal to the driving speed threshold. By the driving speed is meant the momentary driving speed, especially a forward driving speed, of the motor vehicle. The driving speed threshold is selected for example in that, for a driving speed which is less than the driving speed threshold, a slow driving of the motor vehicle with frequent stops or a traffic jam may be inferred.

In addition or alternatively, the road surface gradient should be less than or equal to the road surface gradient threshold. By the road surface gradient is meant preferably an absolute value of the gradient of a road surface on which the motor vehicle finds itself. If a road surface gradient is present which is greater than the road surface gradient threshold, the shifting to the alternative operating mode should preferably be prevented. In addition or alternatively, the absolute acceleration must be less than or equal to the acceleration threshold. By the absolute acceleration is meant the absolute value of an acceleration of the motor vehicle. Accordingly, the absolute acceleration always have positive values or values greater than or equal to zero, regardless of whether the motor vehicle is accelerating or decelerating, i.e., going faster or slower.

In addition or alternatively, a determination is made as to whether the steering angle is less than or equal to the steering angle threshold. Shifting to the alternative operating mode should preferably be prevented if the steering angle is greater than the steering angle threshold. The steering angle threshold is selected for example in dependence on the driving speed or the integrated value of the driving speed. In particular, the steering angle threshold is greater for lower values of the driving speed and/or the integrated value than for larger values. Accordingly, at lower driving speeds a larger steering angle is allowed than at higher driving speeds, so that the alternative operating mode is also allowed for example in city traffic, but not on the freeway. Owing to the smaller steering angle threshold, the alternative operating mode is preferably ended if the motor vehicle turns onto a freeway exit.

In addition or alternatively, a determination is made as to whether the drive gear shift frequency within the drive gear set and/or the subset of the drive gear set surpasses the drive gear shift frequency threshold. If so, there may or should be a switch to the alternative operating mode. By the drive gear shift frequency is meant the number of drive gear changes within a given period of time. The drive gear shift frequency may be evaluated in terms of the total drive gear set or only in terms of the subset of the drive gear set. The subset of the drive gear set contains only a portion of the drive gears in the drive gear set. Especially preferably, the subset contains only the lowest drive gears of the drive gear set.

In addition or alternatively, the temperature must lie within the temperature range. The temperature is for example an outside temperature or the temperature of the transmission device or a lubricant temperature, especially a transmission oil or a motor oil, or a coolant temperature, especially engine cooling water. Because the starting of the motor vehicle is not done in the smallest available drive gear in the alternative operating mode, more heat caused by friction occurs in the transmission device than in the normal operating mode, especially in a starter element, such as a starter clutch, of the transmission device. Now, if the temperature lies outside the temperature range describing for example the permissible operating temperature of the transmission device or the starter element or the starter clutch, the shifting to the alternative operating mode is preferably prevented and otherwise allowed.

In addition or alternatively, the integrated value of the driving speed may be compared to the driving speed range. The integrated value corresponds to the integral of the driving speed over a given period of time. With the aid of the integrated value, accordingly, an average driving speed of the motor vehicle may be inferred. In particular, it may be determined whether the motor vehicle is being operated at low driving speeds and/or with frequent phases of standstill. If the integrated value of the driving speed lies within the driving speed range and/or is less than or equal to the driving speed threshold, the shifting to the alternative operating mode should be allowed or carried out. From the integrated value it is possible to infer, for example, where the motor vehicle is located. In particular, the road type is inferred. With the aid of the integrated value, the road type may be set at freeway, country road, or city, or be selected from these. Other or different road types may also be established. With the aid of the integrated value and/or the road type, at least one limit value and/or the driving mode may be set. In general, the road types can be designated as first road type, second road type, and so forth.

Furthermore, a determination can be made as to whether the accelerator pedal position is less than or equal to the accelerator pedal position threshold. By the accelerator pedal is meant for example a gas pedal of the motor vehicle. The accelerator pedal position accordingly reflects the position of the gas pedal. The more the accelerator pedal is activated, the larger is the accelerator pedal position. Now, switching to the alternative operating mode should preferably only be allowed or performed in particular if this is less than or equal to the accelerator pedal position threshold. In addition or alternatively, a determination can be made as to whether the temporal gradient of the accelerator pedal position is less than or equal to the accelerator pedal position gradient threshold. By the gradient is meant the temporal gradient of the accelerator pedal position. This is larger as the accelerator pedal is activated or released more quickly. Accordingly, the gradient describes a speed or an acceleration of the accelerator pedal activation.

It may also be provided to perform or to allow the shifting to the alternative operating mode when a trailer operation is not present. By trailer operation is meant the use of the motor vehicle as a tractor vehicle. In trailer operation, accordingly, at least one trailer is coupled to the motor vehicle, in particular in such a way that the trailer can be pulled or towed by the motor vehicle. Now, trailer operation is present for example if it is determined that the trailer is attached to the motor vehicle, for example by means of a trailer hitch. In particular, the trailer hitch is checked for a coupling to the trailer and the trailer operation is recognized if the trailer hitch is adjusted for attaching the trailer.

It may also be provided to check the vehicle's weight to see whether it lies in the given vehicle's weight range, i.e., is greater than or equal to a lower limit and/or less than or equal to an upper limit of the vehicle's weight range. The vehicle's weight range ideally comprises an empty weight of the motor vehicle. For example, the lower limit corresponds to the empty weight or is somewhat less than that. In addition or alternatively, the upper limit may be a maximum permissible weight of the motor vehicle or a weight under maximum cargo load. If the condition is fulfilled, the alternative mode may be instituted or allowed.

In particular, at least one of the aforementioned limit values, especially several of the mentioned limit values, in particular all of the mentioned limit values, may essentially be selected at will. By the limit values are meant the driving speed threshold, the road surface gradient threshold, the acceleration threshold, the steering angle threshold, the drive gear shift frequency threshold, the temperature range, the accelerator pedal position threshold and the accelerator pedal position gradient threshold. Of course, at least one of the mentioned limit values, preferably several of the mentioned limit values or all mentioned limit values may also be determined in dependence on at least one operational quantity and/or state variable, for example of the transmission device or the motor vehicle. In particular, the limit value or the limit values may be selected in dependence on the integrated value of the vehicle's speed and/or the road type. What was said for the limit values may also apply analogously to the driving mode.

A further embodiment of the invention calls for shifting to the alternative operating mode when a counter of a driving speed trend analysis reaches or surpasses a counter threshold value, especially only when a driving program corresponds to a forward driving program or a forward drive gear is engaged, and/or when a request has been made for an alternative operating mode. In order to verify whether the switch to the alternative operating mode should be carried out, first of all the driving speed trend analysis is performed, for example. In this context, the counter is determined, which preferably can be either incremented or reset. For example, the counter is reset at the start of the trip or when the driving speed trend analysis is instituted, i.e., it is set at a starting value, such as zero.

Under certain conditions, the counter may be incremented. If the counter reaches or surpasses the counter threshold value, which is set constant or may be chosen variable, there should be a shift to the alternative operating mode. Especially preferably, however, the shift to the alternative operating mode is only performed if both the counter reaches or surpasses the counter threshold value and at the same time the momentary driving program corresponds to the forward driving program or if a forward drive gear is engaged at the moment. The reason for this is that the alternative operating mode should normally only be carried out in stop and go traffic or in a traffic jam, i.e., during frequent stops of the motor vehicle in the forward direction.

In addition or alternatively, the alternative operating mode may of course be instituted when the request for alternative operating mode arrives. This may be the case for example by an explicit request of the driver. However, the alternative operating mode request may also be triggered by a control unit, for example, based on recognition of surroundings done with the aid of at least one sensor. For example, the recognition of the surroundings identifies heavy traffic in the surroundings of the motor vehicle. If this surpasses a given traffic density threshold value, this may be a sign that stop and go traffic or a traffic jam is present. It may also be provided that the counter must have reached or surpassed the counter threshold value and also that the alternative operating mode request is present.

A preferred embodiment of the invention calls for the driving speed trend analysis to be instituted when a starting characteristic is less than a starting characteristic threshold. The starting characteristic is preferably determined permanently or periodically during a driving operation of the motor vehicle. If the starting characteristic is less than the starting characteristic threshold, the driving speed trend analysis is instituted. The starting characteristic threshold is set firm, for example. But as an alternative it may also be determined variably.

A preferred embodiment of the invention specifies that, if the driving speed of the motor vehicle starting from a first driving speed value is increased to a higher second driving speed value and then lowered again or remains constant, the starting characteristic is determined from the maximum accelerator pedal position and/or the maximum driving speed gradient during the driving speed increase. During an analysis of trial measurement runs it has been possible to ascertain that the maximum values of the accelerator pedal position in traffic jams are often much lower than during other starting processes or accelerations of the motor vehicle. The reason for this is that the driver already knows he will soon have to brake again. Accordingly, he will activate the accelerator pedal to a lesser degree than otherwise, in order to bring about a smaller acceleration of the motor vehicle.

During the entire trip of the motor vehicle, starting processes with given criteria are recorded and the maximum accelerator pedal position of the starting processes is memorized. The largest driving speed gradient during the respective starting process is ascertained. The driving speed gradient may then be used as the basis for the starting characteristic. In addition or alternatively, one may consider the maximum accelerator pedal position when determining the starting characteristics. For example, the maximum driving speed gradient will be divided by a chosen divisor, such as two, so that the influence of the driving speed gradient is not too great, and this is added to or subtracted from the maximum accelerator pedal position. Of course, a normalization of the maximum accelerator pedal position and/or the maximum driving speed gradient may be performed beforehand, especially to make these quantities nondimensional.

Thus, first of all it is determined whether the driving speed of the motor vehicle has increased. One takes the first driving speed value, from which the increase in the driving speed occurs. The first driving speed value is preferably a local minimum of the driving speed. Besides the first driving speed value, one takes the second driving speed value, corresponding to the greatest driving speed during the increasing of the driving speed. Preferably, a local maximum of the driving speed exists. After reaching the second driving speed value by the driving speed, the driving speed again decreases or at least remains constant. Thus, the ascertaining of the starting characteristics occurs only during an actual starting or accelerating of the motor vehicle, which at first has a driving speed corresponding to the first driving speed value and then accelerates to a driving speed which corresponds to the second larger driving speed value.

In the context of another embodiment of the invention, it may be provided that the starting characteristic is only detected if the accelerator pedal position when the first driving speed value is present is smaller than the accelerator pedal position threshold. For example, if a full throttle start is at hand, it is immediately evident that the characteristic determined in this case is not relevant to the performing of the alternative operating mode or the recognition of a traffic jam. Accordingly, the detecting of the starting characteristics will be disabled if the accelerator pedal position at the start of the driving speed increase surpasses the accelerator pedal position threshold. The accelerator pedal position threshold can essentially be chosen at will. For example, it corresponds to an accelerator pedal which is not activated. In this case, therefore, the starting characteristic will only be detected if the driving speed begins starting from a driving speed corresponding to the first driving speed value while the accelerator pedal is not activated, or in any case only slightly activated.

Another preferred embodiment of the invention calls for the starting characteristic to be detected only if the driving speed after reaching the second driving speed value is reduced by a given proportion, such as at least 5%, at least 10%, at least 15%, at least 20% or at least 25%. Accordingly, it is not enough for the driving speed to remain constant after the driving speed increase. Instead, a significant reduction must occur, so that in fact a starting characteristic relevant to stop and go traffic or a traffic jam may be detected.

A preferred embodiment of the invention calls for determining the starting characteristic threshold from at least one previously determined starting characteristic, in particular from several previously determined starting characteristics. For example, the starting characteristic threshold corresponds to any given previously determined starting characteristic, such as the first starting characteristic detected during the driving operation or the last detected starting characteristic. Especially preferably, however, several starting characteristics will go into the starting characteristic threshold, such as several of the last detected starting characteristics. For example, the starting characteristic threshold corresponds to the average, especially the weighted average, of the last detected starting characteristics. Alternatively, it is possible to use the median of the previously determined starting characteristics, as long as a sufficient number have been detected. For example, at least four of the immediately previously determined starting characteristics are used in the determining of the starting characteristic threshold.

A modification of the invention calls for using a driving speed value pair with a first driving speed limit value and a second driving speed limit value, whereupon if the first driving speed limit value is surpassed by the first driving speed value and the second driving speed limit value is surpassed by the second driving speed value during the driving speed increase, the counter is incremented. In order to see whether the counter of the driving speed trend analysis needs to be incremented, one therefore uses the driving speed value pair on the one hand and the first driving speed value and the second driving speed value on the other hand.

The first driving speed value and the second driving speed value are determined or have been determined during the driving speed increase. Accordingly, the first driving speed value corresponds to that driving speed of the motor vehicle starting from which the driving speed increase occurs, and the second driving speed value corresponds to the driving speed up to which the driving speed increase occurs. The driving speed value pair includes the first driving speed limit value and the second driving speed limit value. Now, if it is found that the first driving speed value is less than the first driving speed limit value and at the same time the second driving speed value is greater than the second driving speed limit value, the counter will be incremented. By means of this procedure, a so-called "speed hill" is detected, for which there is an acceleration from a "driving speed valley" to a "driving speed peak".

In addition or alternatively, it may be provided that several driving speed value pairs will be used, each with a first driving speed limit value and a second driving speed limit value, and from the several driving speed value pairs that driving speed value pair will be selected which has the smallest first driving speed limit value falling below the first driving speed value, and the counter will be incremented when the second driving speed limit value of the selected driving speed value pair is surpassed by the second driving speed value during the driving speed increase. Basically, the procedure is similar to the one described above. The only difference is that several different driving speed value pairs are used, from which each time one is chosen with the help of the first driving speed value.

The selection is done by the criterion that the selected driving speed value pair has the smallest first driving speed limit value still below the first driving speed value pair out of all the several driving speed value pairs. In other words, a check is made to see which of the first driving speed limit values of the driving speed value pairs are less than the first driving speed value. Then, from the driving speed value pairs for which this is true, that driving speed value pair is selected which has the smallest first driving speed limit value. The procedure after this is similar to what was described above, i.e., the counter is incremented if the second driving speed value surpasses the second driving speed limit value of the selected driving speed value pair.

Preferably, it may be provided that the several driving speed value pairs have different first driving speed limit values and/or different second driving speed limit values. For example, it may be provided that the first driving speed limit values and the second driving speed limit values of the driving speed value pairs are chosen in such a way that they do not overlap each other, i.e., the first driving speed limit value of one of the driving speed value pairs is greater than the second driving speed limit value of another driving speed value pair.

Alternatively, of course, the first driving speed limit value of one of the driving speed value pairs may lie between the first driving speed limit value and the second driving speed limit value of another of the driving speed value pairs. For example, two driving speed value pairs are provided. For a first one, the first driving speed limit value and the second driving speed limit value amount to 3 km/h and 6 km/h and for a second one they amount to 8 km/h and 13 km/h. However, these values may of course be chosen at will and are given here only as examples.

An especially preferred embodiment of the invention calls for the counter to be incremented only if the driving speed immediately prior to or during the driving speed increase is less than the first driving speed limit value at least for a given period of time. The duration of the time period is not zero, but rather for example 1 second, at least 2 seconds, at least 3 seconds, at least 4 seconds, or at least 5 seconds. In this way, the wrong identification of a driving speed hill or ultimately a traffic jam is effectively prevented.

In the context of an advantageous modification of the invention, it is provided that the counter threshold value is ascertained with the help of the road type, in particularly a freeway flag, and/or a hysteresis flag, in particular it is decreased starting from a constant value if the road type indicates a freeway or if the hysteresis flag indicates a previous performance of the alternative operating mode within a given hysteresis time span. For example, the switch to the alternative operating mode may be simplified either if it is determined that the motor vehicle is traveling on a freeway or if the alternative operating mode has already been carried out previously, but at present the normal operating mode is again present. For this, the counter threshold value is determined with the use of the road type or the hysteresis flag.

The road type is present for example in the form of a freeway flag, which is set whenever the motor vehicle is traveling on a freeway. It is preferably provided that the counter threshold value is at first set to a constant value and is only decreased if either the road type indicates a freeway, i.e., the freeway flag is set for example, or alternatively the hysteresis flag is set. Of course, it may also be provided that the counter threshold value is only decreased if both conditions are met.

For example, it is provided in another embodiment of the invention that the freeway flag is set if the driving speed surpasses a freeway driving speed threshold for a particular minimum time period. Of course, the freeway flag may essentially be determined in any desired manner. For example, it is set if a navigational device of the motor vehicle identifies that the motor vehicle is located on a freeway. Other conditions may also be utilized.

But because not every motor vehicle has such a navigational device available and/or the map material used is not properly compiled, it may be necessary to determine the freeway flag in a different way. A simple and dependable procedure for this sets the freeway flag when the driving speed is greater than the freeway driving speed threshold and this condition is present beyond the given minimum time period. For example, as the freeway driving speed threshold one may use for a driving speed of at least 80 km/h, at least 90 km/h, at least 100 km/h, at least 110 km/h or at least 120 km/h. The given minimum time period is for example at least 15 seconds, at least 30 seconds, at least 40 seconds, at least 50 seconds, or at least 60 seconds.

In the context of another embodiment of the invention it is provided that the freeway flat is reset if the steering angle surpasses a given exit steering angle. Especially preferably, the freeway flag is only resent if this condition occurs. Alternatively, of course, it is possible to reset the freeway flag on the basis of the above described navigational device, as long as it is found that the motor vehicle is no longer located on a freeway. However, the use of the steering angle enables a simple and reliable identification of whether the road type corresponds to a freeway. For example, the steering angle describes a position of a steering wheel of the motor vehicle. As the given exit steering angle one will use for example a steering angle of at least 60°, at least 75°, at least 90°, at least 100°, at least 110°, at least 120°, at least 130°, at least 140°, at least 150° or at least 160°. Such a steering angle indicates that the motor vehicle is taking an off-ramp. The steering angle during straight travel of the motor vehicle is exactly 0°, for example.

A preferred modification of the invention calls for the hysteresis flag to be set when there is a switch to the alternative operating mode or when the alternative operating mode has been exited. In order to recognize whether the alternative operating mode has already been previously carried out, the hysteresis flag is set each time the alternative operating mode is instituted or each time the alternative operating mode is exited. In addition or alternatively, the hysteresis flag is reset if the hysteresis time span has elapsed without a switch to the alternative operating mode.

In another preferred embodiment of the invention there is provided a switching to the normal operating mode when one or more of the following conditions apply: a driving program different from the particular driving program and/or a driving mode different from the particular driving mode is set on the transmission device; and/or the driving speed is greater than the driving speed threshold; and/or the road surface gradient is greater than the road surface gradient threshold; and/or the absolute acceleration is greater than the acceleration threshold; and/or the steering angle is greater than the steering angle threshold; and/or the drive gear shift frequency within the drive gear set and/or the subset of the drive gear set is less than or equal to the drive gear shift frequency threshold; and/or the temperature lies outside the temperature range; and/or the integrated value of the driving speed lies outside the driving speed range; and/or the accelerator pedal position is greater than the accelerator pedal position threshold; and/or the temporal gradient of the accelerator pedal position is greater than the accelerator pedal position gradient threshold; and/or trailer operation is present; and/or the vehicle's weight lies outside the given vehicle's weight range; and/or a reverse driving program has been selected or a reverse drive gear has been engaged. Also on the basis of a recognition of the surrounds there may be a switch to the normal operating mode, for example, if the recognition of the surroundings detects a traffic density below the given traffic density threshold value.

For this, we refer basically to the above remarks. The switching to the normal operating mode, preferably from the alternative operating mode, is undertaken already when only a single one of the mentioned conditions is fulfilled. However, alternatively, it may be provided that the switching is only done if at least one of the mentioned conditions, especially several of the mentioned conditions, especially preferably all of the mentioned conditions are fulfilled.

In the context of a preferred embodiment of the invention it is provided that there is a switch to the normal operating mode and/or the counter is reset if the steering angle exceeds the given exit steering angle; and/or if the driving speed is greater than a first driving speed threshold; and/or if the driving speed is greater than a second driving speed threshold, which is less than the first driving speed threshold, for a given time, especially for the minimum time period; and/or when a reverse driving program is selected or when a reverse drive gear is engaged, especially at the same time as another driving speed threshold is surpassed by the driving speed; and/or if the starting characteristic is greater than a starting characteristic exit threshold.

For example, it does not make sense to carry out the alternative operating mode when the motor vehicle is performing maneuvers. This may be recognized with the help of the steering angle. For example, the condition is met if the given exist steering angle is surpassed by the steering angle. In addition or alternatively, it may be determined whether the driving speed is greater than the first driving speed threshold. The first driving speed threshold may be chosen in such a way that it indicates a normal cruising speed of the motor vehicle. For example, the first driving speed threshold is chosen to be a driving speed of at least 40 km/h, at least 50 km/h, at least 60 km/h, at least 80 km/h, at least 90 km/h or at least 100 km/h.

As an additional or alternative criterion it may be checked to see whether the driving speed surpasses the second driving speed threshold beyond the given period of time. The second driving speed threshold is chosen smaller than the first driving speed threshold. For example, it amounts to at least 15 km/h, at least 20 km/h, at least 25 km/h, at least 30 km/h, at least 35 km/h or at least 40 km/h. The given time period may correspond for example to the minimum time span already mentioned. For example, it amounts to at least 30 seconds, at least 40 seconds, at least 50 seconds or at least 60 seconds.

Furthermore, it may be provided to switch to the normal operating mode or to reset the counter when the reverse driving program is selected or the reverse drive gear is engaged. This is especially the case when at the same time the other driving speed threshold is surpassed by the driving speed, i.e., a reverse travel of the motor vehicle has in fact been undertaken. Advantageously, therefore, both conditions must be fulfilled. The other driving speed threshold amounts for example to at least 1 km/h, at least 2 km/h, at least 3 km/h, at least 4 km/h or at least 5 km/h.

Finally, another criterion used may be whether the starting characteristic surpasses the starting characteristic exit threshold. The starting characteristic exit threshold may basically be chosen at will. For example, it is determined similar to the starting value or the starting characteristic threshold, i.e., from the maximum accelerator pedal position and/or the maximum driving speed gradient during the driving speed increase, especially during the immediately preceding driving speed increase or the last immediately preceding driving speed increases.

For example, the starting characteristic exit threshold is determined from the maximum accelerator pedal position during the driving speed increase or the average of the maximum accelerator pedal positions during the driving speed increases and the maximum driving speed gradient or the average of the maximum driving speed gradients of the driving speed increases. For example, the first maximum accelerator pedal position or its average value is multiplied by a first factor and the maximum driving speed gradient or its average value by a second factor and the results of the two multiplications are added. The first factor used may be 1.16, for example, and the second factor may be 1.0.

It should be pointed out explicitly that it may be enough for the switch to the normal operating mode and/or the resetting of the counter if a single one of the aforementioned conditions is met. Preferably, however, several of the conditions or all of the conditions must be met.

One preferred modification of the invention calls for determining the road surface gradient threshold and/or the accelerator pedal position threshold in dependence on a vehicle's weight. The vehicle's weight may be either measured or estimated, the latter being done preferably by means of a vehicle's weight model. Usually the road surface gradient threshold and the accelerator pedal position threshold are chosen to be smaller as the vehicle's weight is larger. This means that for a first vehicle's weight the road surface gradient threshold has a first value, while for a second larger vehicle's weight the road surface gradient threshold and/or the accelerator pedal position threshold each time have a second smaller value. In this way, a reliable operation, especially a starting of the motor vehicle is always made possible. For example, there is a switch from the alternative operating mode to the normal operating mode as soon as it is established that the vehicle's weight is too large to make possible a dependable and comfortable starting of the vehicle given the momentary road surface gradient and/or the momentary accelerator pedal position.

Of course, in a further embodiment of the invention it may be provided that the transmission used is an automated transmission or an automatic transmission. By an automated transmission is meant, for example, a stepped automatic transmission or a multiple-clutch transmission, especially a dual-clutch transmission. The automatic transmission is for example a multiple-clutch transmission, especially a dual-clutch transmission or a torque converter transmission or a torque converter automatic transmission, which has a hydraulic clutch or a torque converter, especially a Trilok converter, as the starter element or starter clutch.

The principal difference between the automated transmission and the automatic transmission lies in the fact that, with the former, the momentarily engaged drive gear or the drive gear set on the transmission must be disengaged before and/or during a standstill of the motor vehicle or alternatively the starter element or the starter clutch must be opened. In the case of the automatic transmission, the drive gear may remain in place even during standstill of the motor vehicle, i.e., it may remain set on the transmission. However, any torque converter lockup which is present must be opened, in order to accomplish a nearly total decoupling between the drive mechanism and the at least one driven axle by means of the torque converter.

The invention furthermore concerns a transmission device for a motor vehicle, especially for carrying out the above explained method, wherein the transmission device is designed to select a drive gear from a drive gear set and set it on a transmission and/or upon going above a rotational speed upper limit to select a drive gear with a larger gearing ratio and/or upon going below a rotational speed lower limit to select a drive gear with a smaller gearing ratio from the drive gear set and to set it on the transmission. It is provided that, in a normal operating mode, the drive gear set corresponds to a normal operation drive gear set having a plurality of different drive gears, and/or the rotational speed upper limit corresponds to a normal operation rotational speed upper limit and/or the rotational speed lower limit corresponds to a normal operation rotational speed lower limit, and in an alternative operating mode the drive gear set corresponds to an alternative operation drive gear set, having a smaller number of different drive gears than the normal operation drive gear set, and/or the rotational speed upper limit corresponds to an alternative operation rotational speed upper limit which is different from the normal operation rotational speed upper limit and/or the rotational speed lower limit corresponds to an alternative operation rotational speed lower limit which is different from the normal operation rotational speed lower limit.

The benefits of such a procedure and such a design of the transmission device have already been pointed out. Both the transmission device and the method may be modified in accordance with the above remarks, so that reference is made to them in this regard.

BRIEF DESCRIPTION OF THE DRAWINGS

The invention shall now be explained more closely with the help of the sample embodiments represented in the drawing, without this meaning a limitation of the invention.

DETAILED DESCRIPTION OF THE DRAWINGS

Figure 1:
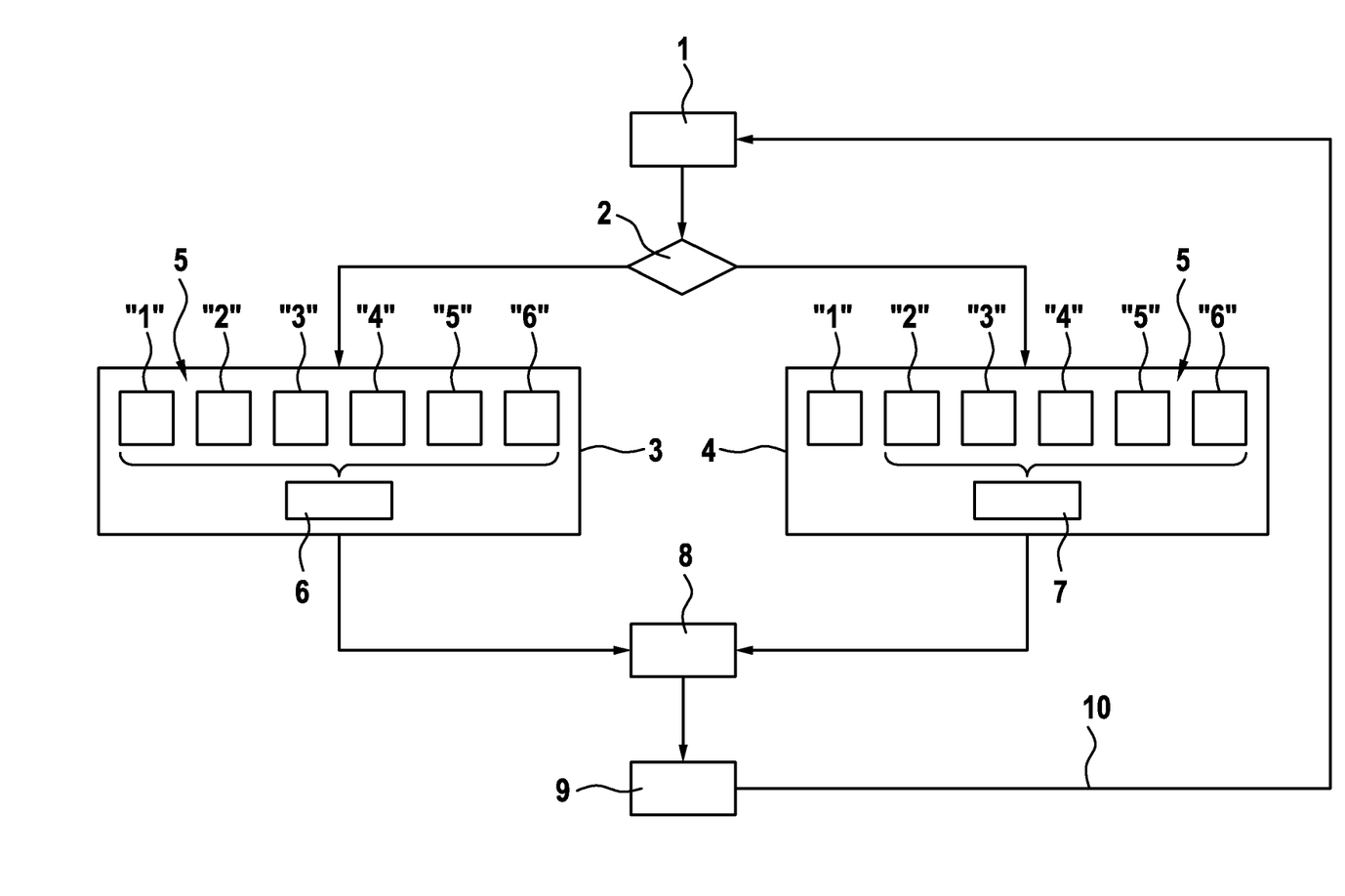
FIG. 1 shows a flow chart of a method for operating a transmission device for a motor vehicle.

FIG. 1 shows a flow chart by means of which a method is described for operating a transmission device. The transmission device is associated for example with a motor vehicle and accordingly forms part of this vehicle. The method begins at a starting point 1. Starting from this, at a branching point 2 there is a check to see whether a momentary operating mode of the transmission device is a normal operating mode or an alternative operating mode. In the former case, the branch goes to an operation 3, in the latter case it goes to an operation 4.

In the context of operation 3, there is indicated a total drive gear set 5, which contains all drive gears, especially all forward drive gears, of the transmission. In the sample embodiment shown here, six forward drive gears are provided, being denoted as "1", "2", "3", "4", "5" and "6", while the gearing ratio associated with the particular drive gear increases in this order. Basically, the number of drive gears, especially the forward drive gears, may however be chosen arbitrarily. Now, in the context of operation 3, a normal operation drive gear set 6 is selected from the drive gears present in the total drive gear set 5. Usually the normal operation drive gear set 6 corresponds to the total drive gear set 5, i.e., it likewise contains all drive gears or all forward drive gears. This is indicated by the brackets enclosing all the drive gears.

In the context of operation 4, an alternative operation drive gear set 7 is composed for the alternative operating mode. Once again, the total drive gear set 5 is indicated here. It becomes clear that the alternative operation drive gear set 7 does not include all gears of the total drive gear set 5. In particular, the smallest drive gear of the alternative operation drive gear set 7 is larger than a smallest drive gear of the normal operation drive gear set 6. In the example represented here, the alternative operation drive gear set 7 contains all the drive gears of the total drive gear set 5 with the exception of the smallest drive gear "1". If operation 3 is carried out, a drive gear set will correspond hereafter to the normal operation drive gear set 6; on the other hand, if operation 4 is carried out, the drive gear set will correspond to the alternative drive gear set 7.

In the course of an operation 8 now a drive gear is selected from the drive gear set, i.e., either the normal operation drive gear set 6 or the alternative operation drive gear set 7, and this is set on the transmission. This may be provided, for example, when a rotational speed, especially a rotational speed of an input shaft of the transmission and/or a rotational speed of a drive mechanism of the motor vehicle and/or an output rotational speed, i.e., for example the rotational speed of a transmission output shaft of the shifting transmission surpasses a rotational speed upper limit. In this case, a larger drive gear or a drive gear with a larger gearing ratio than the drive gear engaged at the moment or set on the transmission will be selected from the drive gear set and set on the transmission.

In event of falling below a rotational speed lower limit by the rotational speed, a similar procedure may occur, but here a smaller drive gear or a drive gear with a smaller gearing ratio will be selected from the drive gear set. Operation 8 is followed by an end point 9, at which the procedure can be terminated. Alternatively, there can be a jump to the starting point 11 once again along the arrow 10.

With the help of the method presented here, the number of shifting events can be reduced, especially during slow driving of the motor vehicle or during stop and go traffic, i.e., a traffic jam. This significantly improves the driving comfort of the motor vehicle.

The invention claimed is:

1. A method for operating a transmission device for a motor vehicle, the method comprises:
    selecting a first drive gear with a larger gearing ratio from a drive gear set and setting the first drive gear on a transmission upon going above a rotational speed upper limit;
    selecting a second gear with a smaller gearing ratio from a drive gear set and setting the second drive gear on the transmission upon going below a rotational speed lower limit;
    wherein, in a normal operating mode, the drive gear set corresponds to a normal operation drive gear set having a plurality of different drive gears, and the rotational speed upper limit corresponds to a normal operation rotational speed upper limit and the rotational speed lower limit corresponds to a normal operation rotational speed lower limit,
    wherein, in an alternative operating mode, the drive gear set corresponds to an alternative operation drive gear set, having a smaller number of different drive gears than the normal operation drive gear set, and the rotational speed upper limit corresponds to an alternative operation rotational speed upper limit which is different from the normal operation rotational speed upper limit and/or the rotational speed lower limit corresponds to an alternative operation rotational speed lower limit which is different from the normal operation rotational speed lower limit, and
    the rotational speed upper limit corresponds to an alternative operation rotational speed upper limit which is higher than the normal operation rotational speed upper limit and/or the rotational speed lower limit corresponds to an alternative operation rotational speed lower limit which is lower than the normal operation rotational speed lower limit.

2. The method according to claim 1, wherein a smallest drive gear of the alternative operation drive gear set is larger than a smallest drive gear of the normal operation drive gear set.

3. The method according to claim 2, wherein the smallest drive gear of the alternative operation drive gear set corresponds to a drive gear following the smallest drive gear of the normal operation drive gear set in series of sizes of the drive gear set.

4. The method according to claim 2, wherein the smallest drive gear of the alternative operation drive gear set is designed as a starting gear.

5. The method according to claim 1, wherein there is a shift to the alternative operating mode if one or more of the following conditions applies:
    a particular driving program or a particular driving mode is set on the transmission device;
    a driving speed is less than or equal to a driving speed threshold;
    a road surface gradient is less than or equal to a road surface gradient threshold;
    an absolute acceleration is less than or equal to an acceleration threshold;
    a steering angle is less than or equal to a steering angle threshold;
    a drive gear shift frequency within the drive gear set and/or a subset of the drive gear set surpasses a drive gear shift frequency threshold;
    a temperature lies within a temperature range;
    an integrated value of the driving speed lies within a driving speed range;
    an accelerator pedal position is less than or equal to an accelerator pedal position threshold;
    a temporal gradient of the accelerator pedal position is less than or equal to an accelerator pedal position gradient threshold;
    a trailer operation is not present; and
    a vehicle's weight lies within a particular vehicle's weight range.

6. The method according to claim 5, wherein the road surface gradient threshold and the accelerator pedal position threshold are determined as a function of the vehicle's weight.

7. The method according to claim 1, wherein there is a shift to the normal operating mode if one or more of the following conditions applies:
    a driving program is set on the transmission device which differs from the particular driving program and a driving mode is set which is different from the particular driving mode;
    the driving speed is greater than the driving speed threshold;
    the road surface gradient is greater than the road surface gradient threshold;
    the absolute acceleration is greater than the acceleration threshold;
    the steering angle is greater than the steering angle threshold;
    the drive gear shift frequency within the drive gear set and the subset of the drive gear set is less than or equal to the drive gear shift frequency threshold;
    the temperature lies outside the temperature range;
    the integrated value of the driving speed lies outside the driving speed range;

the accelerator pedal position is greater than the accelerator pedal position threshold;
the temporal gradient of the accelerator pedal position is greater than the accelerator pedal position gradient threshold;
the trailer operation is present; and
the vehicle's weight lies outside the particular vehicle's weight range.

8. The method according to claim 1, wherein the transmission is an automated transmission or an automatic transmission.

9. A transmission device for a motor vehicle, the transmission device comprises:
a drive gear set; and
a transmission,
wherein a first drive gear with a larger gearing ratio is selected from the drive gear set upon going above a rotational speed upper limit and set on the transmission,
wherein a second gear with a smaller gearing ratio is selected from the drive gear set upon going below a rotational speed lower limit and set on the transmission,
wherein, in a normal operating mode, the drive gear set corresponds to a normal operation drive gear set having a plurality of different drive gears, and/or the rotational speed upper limit corresponds to a normal operation rotational speed upper limit and the rotational speed lower limit corresponds to a normal operation rotational speed lower limit,
wherein, in an alternative operating mode, the drive gear set corresponds to an alternative operation drive gear set, having a smaller number of different drive gears than the normal operation drive gear set, and/or the rotational speed upper limit corresponds to an alternative operation rotational speed upper limit which is different from the normal operation rotational speed upper limit and the rotational speed lower limit corresponds to an alternative operation rotational speed lower limit which is different from the normal operation rotational speed lower limit.

* * * * *